United States Patent [19]
Waltz

[11] 3,928,793
[45] Dec. 23, 1975

[54] POWER SUPPLY CIRCUIT WITH ELECTRO-MAGNETIC FEEDBACK
[75] Inventor: Douglas G. Waltz, Garland, Tex.
[73] Assignee: Varo Semiconductor, Inc., Garland, Tex.
[22] Filed: July 31, 1974
[21] Appl. No.: 493,247

[52] U.S. Cl. .................... 321/2; 321/15; 331/112; 331/117 R
[51] Int. Cl.² ........................................ H02M 3/315
[58] Field of Search ...... 321/2, 15; 331/112, 117 R, 331/116 R

[56] References Cited
UNITED STATES PATENTS

| | | | |
|---|---|---|---|
| 3,428,807 | 2/1969 | Jones et al. | 321/15 |
| 3,503,008 | 3/1970 | Deligniers | 331/117 |
| 3,621,363 | 11/1971 | Ginnman et al. | 321/2 |
| 3,831,078 | 8/1974 | Peil | 321/2 |

Primary Examiner—Gerald Goldberg
Attorney, Agent, or Firm—Olson, Trexler, Wolters, Bushnell & Fosse, Ltd.

[57] ABSTRACT

The embodiment of the invention disclosed herein is directed to a power supply circuit for providing operating voltage to electric utilization means. The power supply includes an oscillator circuit which has a transistor connected in series with the primary winding of a coupling transformer, which primary winding functions as the inductance element of a resonant tank circuit. A capacitor is connected in parallel with the inductance element and recirculating current flows therebetween. An electro-magnetic feedback element is coupled to the leads of either the capacitor or inductance element to sense the recirculating currents within the tank circuit formed thereby. Heavy load conditions at the output of the power supply will cause a decrease in the recirculating currents thereby reducing the feedback for the oscillator which, in turn, will reduce the output of the power supply.

10 Claims, 2 Drawing Figures

POWER SUPPLY CIRCUIT WITH ELECTRO-MAGNETIC FEEDBACK

BACKGROUND OF THE INVENTION

This invention relates generally to power supply circuits, and more particularly to a power supply circuit which utilizes oscillator means to develop alternating current voltage to be rectified for high voltage usage. More specifically, the power supply circuit of this invention is intended for use in high voltage low cost circuit applications such as electrostatic air filtering, and the like.

Heretofore, the utilization of air filtering means to purify air, particularly in large urban areas, for health purposes required the use of relatively large and complex filtering equipment. One such air filtering apparatus utilizes high voltage across a grid arrangement to provide an electrostatic charge to accumulate particles from the air. However, these prior art electrostatic air filtering circuits were relatively expensive because of the complexity of the electronic equipment required to achieve the necessary safety features for acceptance by the general public.

For example, high voltage electrostatic filter circuits require that the high voltage circuitry be adequately protected in the event of heavy load or short circuit conditions so that no excessive current flow will occur to overheat existing wiring either in the home outlet or in the electrostatic unit itself. Such high current protection on high voltage circuits heretofore has been relatively complex and expensive in that they either required exotic sensing equipment or expensive cutoff switching circuits to disable the electrostatic unit.

SUMMARY OF THE INVENTION

Accordingly, it is among the objects of this invention to provide a new and improved high voltage power supply circuit for use particularly with electrostatic air filter systems.

Still another object of this invention is to provide a new and improved power supply circuit which has automatic means for decreasing or terminating current flow within the power supply circuit upon sensing excessive loads at the output terminal thereof.

Still another object of this invention is to provide a new and improved power supply system for use with electrostatic air filtering equipment, which power supply system is relatively inexpensive and simple to manufacture while maintaining a high degree of reliability and efficiency in operation.

A feature of the present invention is the utilization of an electro-magnetic coupling within a parallel tank circuit to sense recirculating currents in the tank circuit and which electro-magnetic coupling is applied to the control electrode of a transistor which, together with the tank circuit functions as an oscillator.

Briefly, the electro-magnetic feedback arrangement of the present invention functions as a current-limiting device when a low resistance load or short circuit condition is sensed at the output terminal of the power supply. As the output terminal current increases the recirculating current within the tank circuit decreases. The electro-magnetic coupling then reduces the positive feedback voltage to the transistor to reduce the amplitude of oscillations produced thereby. Upon sufficient loading of the output of the power supply, recirculating currents within the tank circuit cease and oscillations terminate. This then provides a simple and inexpensive automatic cutoff arrangement for the power supply circuit when a heavy load or short circuit condition exists.

Many other objects, features and advantages of this invention will be more fully realized and understood from the following detailed description when taken in conjunction with the accompanying drawings wherein like reference numerals throughout the various views of the drawings are intended to designate similar elements or components.

DETAILED DESCRIPTION OF THE ILLUSTRATED EMBODIMENTS

Figure 1:
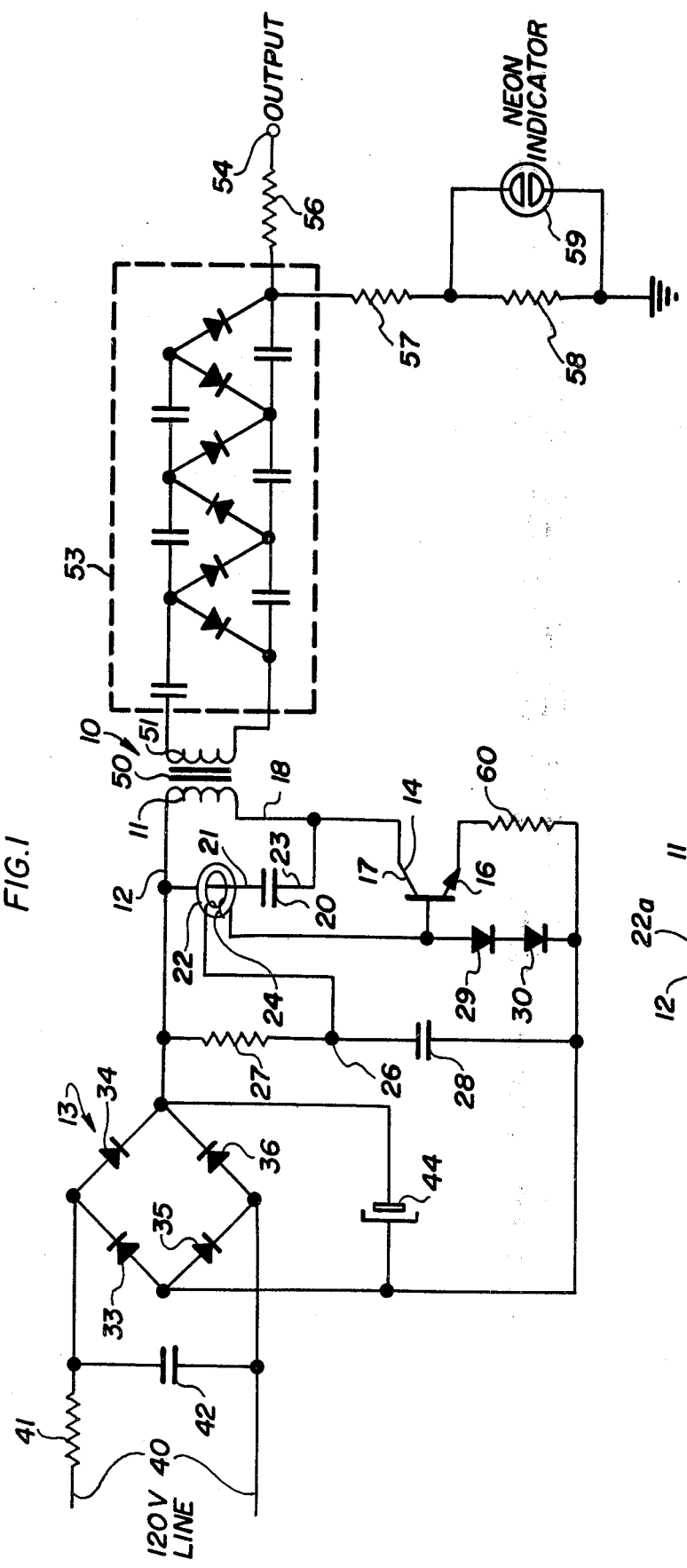
FIG. 1 is a schematic diagram of a power supply constructed in accordance with the principles of this invention utilizing a novel feedback control circuit arrangement.

Referring now to FIG. 1 there is seen a power supply for providing an operating voltage to electric utilization means constructed in accordance with the principles of this invention and designated generally by reference numeral 10. The power supply 10 includes inductance means 11 having at least one lead 12 extending therefrom for receiving a direct current voltage of the first value from an AC to DC power source designated generally by reference numeral 13. However it will be understood that the power source 13 may be replaced by a battery. A solid state switching device 14 has the load electrodes 16 and 17 thereof connected to another lead 18 of the inductance element 11 to be in series therewith. In the illustrated embodiment the solid state switching device 14 is illustrated as a transistor. The novel feedback circuit arrangement of this invention allows transistors of widely varying current gains and types to be used without adversely affecting circuit operation. Therefore, substantial savings in cost are achieved.

A capacitor 20 has one lead 21 thereof connected to lead 12 of inductance element 11 and passing through an opening formed in a toroid 22. Capacitor 20 has a second lead 23 connected to lead 18 of the inductance element 11 to be in parallel therewith to form a resonant tank circuit.

Most advantageously, the feedback for operation of the oscillator formed by inductance element 11, capacitor 20 and switching device 14 is obtained by transformer coupling through the toroid 23. In this instance lead 21 functions as a single-turn primary winding for a feedback-coupling transformer formed by the toroid. A second winding 24 is formed by several turns about the toroid and has one lead extending therefrom connected to a terminal point 26 between a resistor 27 and capacitor 28. The other lead from secondary winding 24 is connected to the control electrode of the solid state switching device 14. Also connected to the base electrode of transistor 14 area a pair of series-connected diodes 29 and 30. Diodes 29 and 30 operate as a biasing control circuit for the transistor. The toroid 22 is electro-magnetically coupled to the recirculating currents formed within the tank circuit when the circuit oscillates.

The power supply 13 is formed of a bridge rectifier comprising four diodes 33, 34, 35 and 36 arranged for connection to a source of alternating current voltage such as that obtained from a standard house line 40. A current-limiting resistor 41 is connected in series therewith and a capacitor 42 is connected in shunt relation with the lines 40 to provide a voltage transient damping circuit. To provide a uniform DC voltage for operation of the oscillator circuit of this invention a filter capacitor 44 is connected across the bridge rectifier.

In the illustrated embodiment the inductance element 11 is formed as the primary winding of a transformer 50 which, in turn, has the secondary winding 51 thereof connected to a voltage multiplier circuit 53. The voltage multiplier circuit is of standard configuration, being a tripler in the illustrated embodiment, so that the output voltage applied to terminal 54 is three times that of the peak-to-peak voltage developed across the secondary winding 51 of the transformer 50. A current-limiting resistor 56 is connected in series with the multiplier circuit 53 and the output terminal 54. A bleeder-resistor network, comprising resistors 57, 58 and a neon indicating lamp 59, is provided. The resistors provide a leakage current path when the power supply is de-energized to insure that the capacitive output circuit of the multiplier 53 is discharged. The neon indicating lamp 59 indicates that power is applied to the circuit and available at the output terminal 54.

Capacitor 28 forms a low impedance alternating current path for the base electrode of the transistor 14 to sustain the feedback required for oscillations. In the illustrated embodiment the toroid 22 has the primary winding formed of one turn, preferably one of the leads of either the capacitor or the inductor, and the secondary winding formed of several turns of wire. The phasing of the feedback signal is positive to the base electrode of the transistor 14 to cause periodic oscillations to occur. The oscillation frequency is determined by the inductor 11, capacitor 20, and in the illustrated embodiment is in the order of about 25 KHz.

While the illustrated circuit configuration of FIG. 1 utilizes a step-up transformer 50 it will be understood that a step-down transformer may be incorporated without departing from the novel concepts of this invention. Furthermore, the voltage multiplier circuit 53 may be replaced by a standard half wave, full wave or bridge rectifier circuit arrangement.

In operation, resistor 27 forward biases the transistor 14 into conduction by means of a current path through resistor 27, secondary winding 24 of toroid 22 and the baseemitter junction of transistor 14 and through a current-limiting resistor 60. Current flow to charge capacitor 20 is sensed by the toroid 22 and provides a regenerative drive signal to the base electrode of the transistor. At the 90° phase point in the oscillation, the regenerative drive to the base of transistor 14 reverses and thus causes the drive current polarity to reverse and cut off the transistor. However, conduction through transistor 14 continues for a short period of time. When transistor 14 is rendered nonconductive by the depletion of the storage time associated with the transistor, voltage across the transistor will start to increase due to the energy stored in the inductance element 11. A cycle of resonance occurs and when the polarity is correct another pulse of regenerative drive is applied to the base electrode of transistor 14 so the next cycle of oscillation starts. The toroid 22 formed by the single lead primary winding and multiple turn secondary winding therefore functions as a feedback circuit to sustain oscillations of the oscillator.

However, another function of the toroid 22 is to cause a decrease in positive feedback to the transistor when the output is heavily loaded or short circuited. The circuit functions to limit output current below a level that is dangerous to personnel. The decrease in positive feedback is due to sensing a substantial decrease in recirculating current within the tank circuit formed by inductance 11 and capacitor 20. The tank circuit has a normally high Q and the peak-to-peak recirculating current is therefore high. The current transformer formed by the toroid senses the high recirculating current to provide the feedback for sustaining oscillations. When the output terminal 54 is heavily loaded, or short circuited, the low impedance is reflected to the primary winding 11 of the transformer 50 and therefore reduces the Q of the tank circuit and lowers the peak-to-peak recirculating current therein. The current transformer formed by the toroid 22 then senses the low peak-to-peak current and reduces the drive delivered to the transistor for oscillations. Carried to the extreme of operation, the circuit will cease or nearly cease to oscillate when the output terminal 54 is short circuited. By providing a feedback scheme which is electro-magnetically coupled to the recirculating currents of the tank circuit of an oscillator, transistors of widely varying current gain characteristics can be utilized to obtain nearly the same output voltages. This substantially decreases circuit complexity and cost.

Figure 2:
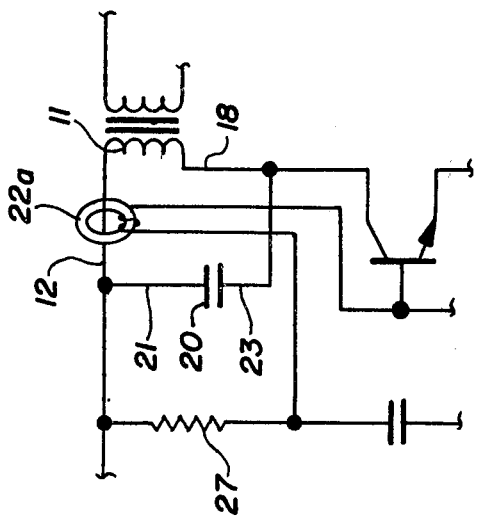
FIG. 2 is an alternate circuit configuration of the feedback circuit of FIG. 1.

Referring now to FIG. 2 there is seen an alternate embodiment of the present invention. Here the toroid 22a is illustrated as being placed in circuit with the lead 12 of the inductance element 11. Recirculating current within the tank circuit at this point is substantially the same as that of the recirculating current sensed by the capacitor leads.

While two embodiments of the present invention have been illustrated herein it will be understood that still further variations and modifications may be effected without departing from the spirit and scope of the novel concepts disclosed and claimed herein.

The invention claimed is as follows:

1. In a power supply for providing an operating voltage to an electric utilization means, the combination comprising: inductance means having a first and a second lead, said first lead extending therefrom for receiving DC current of a first value; a switchable circuit including solid state switching means having load electrodes connected to said second lead of said inductance means to be in series therewith, said solid state switching means further including a control electrode; capacitor means having a pair of electrical leads extending therefrom and connected in circuit with the leads of said inductance means to form a resonant circuit therewith, said switchable circuit providing a current path to initiate oscillation of said resonant circuit; feedback means electro-magnetically coupled to at least one of the leads of said inductance means and to said capacitor means to sense circulating current flow therethrough, said feedback means being coupled to said control electrode of said solid state switching means to cause said inductance means, capacitor means and said solid state switching means to function as an oscillator, said feedback means being responsive to the amplitude of oscillation from said oscillator to disable said oscillator when reduced circulating current is sensed between said inductance and capacitor means by said feedback means; and rectifier means coupled to said inductance means to provide a DC voltage of a second value to an output terminal thereof to be delivered to the electric utilization means.

2. In the power supply for providing an operating voltage to an electric utilization means as set forth in claim 1 wherein said feedback means includes an electro-magnetic toroid having an opening therein to receive the leads of said inductance means which function as a primary winding of a feedback coupling transformer formed thereby, a secondary winding formed on said toroid and coupled to said control electrode of said solid state switching means.

3. In the power supply for providing an operating voltage to electric utilization means as set forth in claim 2 wherein said toroid receives one of the leads of said capacitor means.

4. In the power supply for providing an operating voltage to electric utilization means as set forth in claim 1 wherein said inductance means and said capacitor means are connected in parallel to provide a tank circuit with high recirculating currents therethrough, said feedback means sensing the relative value of said recirculating currents and controlling conduction of said solid state switching means in response thereto.

5. In the power supply for providing an operating voltage to electric utilization means as set forth in claim 1 wherein said inductance means forms the primary winding of a step-up transformer, said rectifier means being coupled to a secondary winding of said step-up transformer.

6. In the power supply for providing an operating voltage to electric utilization means as set forth in claim 5 wherein said rectifier means is a multiplier circuit such that said second voltage value is greater than said first voltage value.

7. In the power supply for providing an operating voltage to electric utilization means as set forth in claim 1 further including rectifier and filter circuit means adapted to be connected to a source of voltage from a conventional alternating current voltage house line to develop said first DC current to be delivered to said one terminal of said conductance means.

8. In a power supply circuit the combination comprising: an oscillator circuit including inductive and capacitive elements for providing an alternating current voltage at the output thereof said oscillator circuit having relatively high recirculating currents therein when loads coupled to the power supply are below a predetermined minimum value, a transformer having the primary winding thereof forming the inductive element of said oscillator circuit, said transformer further including a secondary winding to transformer couple said alternating current voltage, rectifier circuit means coupled to the secondary winding of said transformer for providing a direct current voltage to an output terminal of the power supply and variations in load resistance at said output terminal being reflected from the secondary winding of said transformer back to said primary winding thereof, and electro-magnetic means coupled to said oscillator circuit for sensing a decrease in recirculating current as a result of increased load at said output terminal, whereby automatic current control is obtained by sensing of the increased load at said output terminal which results in reduced recirculating current within said oscillator circuit.

9. In the power supply circuit as set forth in claim 8 wherein said electro-magnetic means is formed of a toroid transformer having a closed-loop magnetic core with a primary winding being formed by one lead of one of said inductance element and said capacitance element, and a secondary winding formed thereon to provide feedback for said oscillator circuit.

10. The power supply as set forth in claim 8 wherein said rectifier means connected between the secondary winding of said transformer and said output terminal is a multiplier circuit to provide a high voltage at said output terminal.

* * * * *

UNITED STATES PATENT OFFICE
CERTIFICATE OF CORRECTION

Patent No. 3,928,793　　　　　　　　Dated December 23, 1975

Inventor(s) Douglas G. Waltz

It is certified that error appears in the above-identified patent and that said Letters Patent are hereby corrected as shown below:

The illustrative figure and Fig. 1, should appear as shown below:

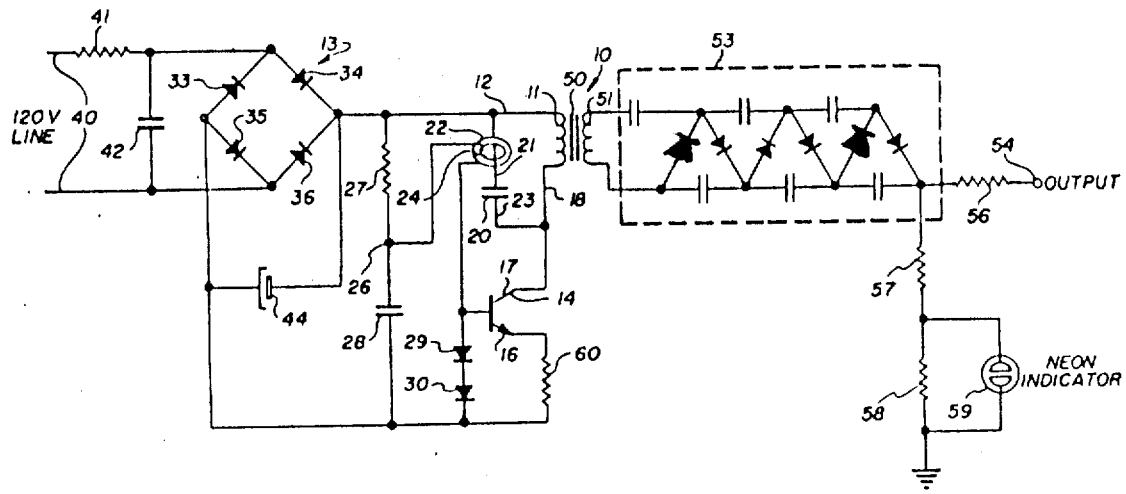

Signed and Sealed this fifteenth Day of June 1976

[SEAL]

Attest:

RUTH C. MASON
*Attesting Officer*

C. MARSHALL DANN
*Commissioner of Patents and Trademarks*